US012572005B2

(12) United States Patent
Sato et al.

(10) Patent No.: US 12,572,005 B2
(45) Date of Patent: Mar. 10, 2026

(54) OPTICAL SCANNING DEVICE AND IMAGE FORMING DEVICE

(71) Applicant: SHARP KABUSHIKI KAISHA, Sakai (JP)

(72) Inventors: Hidenori Sato, Sakai (JP); Hiroshi Yamamoto, Sakai (JP); Kenzo Ohkubo, Sakai (JP); Takaharu Motoyama, Sakai (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 404 days.

(21) Appl. No.: 18/120,181

(22) Filed: Mar. 10, 2023

(65) Prior Publication Data

US 2023/0296869 A1 Sep. 21, 2023

(30) Foreign Application Priority Data

Mar. 16, 2022 (JP) ................................. 2022-041537

(51) Int. Cl.
| *G02B 19/00* | (2006.01) |
| *G02B 26/12* | (2006.01) |
| *G02B 27/30* | (2006.01) |

(52) U.S. Cl.
CPC ....... *G02B 19/0052* (2013.01); *G02B 26/124* (2013.01); *G02B 27/30* (2013.01); *G02B 2207/117* (2013.01)

(58) Field of Classification Search
None
See application file for complete search history.

(56) References Cited

U.S. PATENT DOCUMENTS

| 4,390,235 | A | * | 6/1983 | Minoura | ................ | G02B 26/10 |
| | | | | | | 359/204.1 |
| 5,343,325 | A | * | 8/1994 | Yamakawa | .......... | G02B 26/125 |
| | | | | | | 359/717 |
| 7,265,885 | B2 | | 9/2007 | Susumu | | |
| RE50,141 | E | | 9/2024 | Kawana et al. | | |
| 2001/0022343 | A1 | | 9/2001 | Sakai et al. | | |
| 2003/0209659 | A1 | | 11/2003 | Sakai et al. | | |

(Continued)

FOREIGN PATENT DOCUMENTS

| JP | H0380213 A | 4/1991 |
| JP | 2001311895 A | 11/2001 |

(Continued)

*Primary Examiner* — Sharrief I Broome
*Assistant Examiner* — Journey F Sumlar
(74) *Attorney, Agent, or Firm* — ScienBiziP, P.C.

(57) ABSTRACT

An optical scanning unit steers a light beam emitted from a laser diode in the main scanning direction by a polygon mirror. The laser diode, a collimator lens, an aperture, a first lens, the polygon mirror, and a condensing lens are sequentially placed in the optical system of the optical scanning unit. The laser diode emits a light beam in which divergent angles in intersecting two directions are different from each other. The direction in which the light beam divergent angle is large is aligned with the sub-scanning direction, and the direction in which the light beam divergent angle is small is aligned with the main scanning direction. The first lens has a first function to condense a beam in the sub-scanning direction and a second function to diffuse a beam in the main scanning direction.

7 Claims, 6 Drawing Sheets

10

(56)     References Cited

U.S. PATENT DOCUMENTS

| | | | |
|---|---|---|---|
| 2005/0105155 A1 | 5/2005 | Susumu | |
| 2005/0185238 A1* | 8/2005 | Kimura | G02B 26/124 |
| | | | 359/201.1 |
| 2007/0002417 A1* | 1/2007 | Hirakawa | G02B 26/125 |
| | | | 359/205.1 |
| 2008/0165393 A1* | 7/2008 | Igarashi | G02B 27/0031 |
| | | | 358/474 |
| 2009/0201358 A1 | 8/2009 | Nakamura | |
| 2015/0365554 A1 | 12/2015 | Kawana et al. | |
| 2016/0187806 A1 | 6/2016 | Kawana et al. | |
| 2017/0235247 A1 | 8/2017 | Kawana et al. | |
| 2017/0293236 A1* | 10/2017 | Kimura | G02B 26/12 |
| 2018/0275557 A1 | 9/2018 | Kawana et al. | |
| 2019/0286006 A1* | 9/2019 | Yuasa | G02B 26/121 |

FOREIGN PATENT DOCUMENTS

| | | | | |
|---|---|---|---|---|
| JP | 2004191479 A | * | 7/2004 | |
| JP | 2005-150451 A | | 6/2005 | |
| JP | 2005308807 A | | 11/2005 | |
| JP | 2009069508 A | * | 4/2009 | G02B 26/124 |
| JP | 2009192563 A | | 8/2009 | |
| JP | 2013190568 A | * | 9/2013 | |
| JP | 2016000510 A | | 1/2016 | |

* cited by examiner

PGM

B

12

11

AP

COL

LD

OPTICAL SCANNING DEVICE AND IMAGE FORMING DEVICE

BACKGROUND OF THE INVENTION

Field of the Invention

The present disclosure relates to an optical scanning device and an image forming device using same.

Description of the Background Art

Optical scanning devices are used to write latent images onto image carriers (photoreceptor drums), in image forming devices such as multifunction machines. Such optical scanning devices are provided with an optical system including a light source, a deflector, and various optical lenses. FIG. 5 is a schematic configuration diagram of an optical system in a conventional optical scanning device. FIG. 6 is an example of the layout of an optical system in an optical scanning device viewed from the sub-scanning direction side. The optical systems shown in FIG. 5 and FIG. 6 each include a laser diode LD serving as a light source, a collimator lens COL, an aperture AP, a cylindrical lens CYL, a polygon mirror PGM, and a condensing lens FL. The collimator lens COL converts a light beam B emitted from the laser diode LD into parallel light. The aperture AP is an opening window that cuts part of the light beam B and forms same into a rectangular beam. The cylindrical lens CYL functions to condense light only in the sub-scanning direction. The polygon mirror PGM is a deflector that steers (deflects) the light beam B in the main scanning direction. The condensing lens FL condenses the light beam B deflected by the polygon mirror PGM toward an image plane (surface of a photoreceptor drum).

The light beam B emitted from the laser diode LD generally has an elliptical shape, and divergent angles in intersecting two directions are different from each other. In conventional optical systems, the major axis (direction in which the divergent angle is large) of the ellipse is aligned with the main scanning direction, and the minor axis (direction in which the divergent angle is small) of the ellipse is aligned with the sub-scanning direction, as shown in FIG. 5.

In recent years, the number of lenses in an optical scanning device has been reduced, and the lenses have been miniaturized in order to reduce material costs and unit size. One possible method therefore is to shorten the distance between the polygon mirror PGM and the condensing lens FL (PGM-FL distance) and miniaturize the condensing lens FL. That is, as shown in FIG. 6, since the light beam B steered by the polygon mirror PGM enters the condensing lens FL, the main scanning direction is required to be long; meanwhile, the length of the condensing lens FL in the main scanning direction can be shortened by shortening the PGM-FL distance.

On the other hand, when the PGM-FL distance is shortened, the linewidth of the light beam B entering the condensing lens FL in the sub-scanning direction in which diffusion light enters the condensing lens FL decreases. The linewidth of a light beam entering a condensing lens affects the spot diameter of the condensed light beam, and it is known that the wider the linewidth, the smaller the spot diameter (narrower the beam) can be. That is, when the linewidth of the light beam B entering the condensing lens FL is narrowed, the following problem arises: the beam cannot be limited on the image plane, and necessary beam size cannot be achieved on the image plane (beam size becomes excessively large).

The present disclosure has been made in view of the above problem, and the purpose thereof is to provide an optical scanning device and image forming device capable of achieving both miniaturization of the condensing lens and necessary beam size.

SUMMARY OF THE INVENTION

In order to solve the above problem, an optical scanning device according to a first aspect of the present disclosure steers, in a main scanning direction, a light beam emitted from a light emitting element using a deflector, the optical scanning device including a collimator lens disposed between the light emitting element and the deflector and converting the light beam emitted from the light emitting element into parallel light, an aperture cutting part of the light beam and forming the light beam into a rectangular beam, a condensing lens disposed on a downstream side of the light beam with respect to the deflector and condensing the light beam deflected by the deflector toward an object to be scanned, and a light condensing and diffusing member disposed between the aperture and the deflector and having a first function to condense a beam in a sub-scanning direction and a second function to diffuse a beam in the main scanning direction, in which divergent angles of the light beam emitted from the light emitting element in intersecting two directions are different from each other, the direction in which the light beam divergent angle is large is aligned with the sub-scanning direction, and the direction in which the light beam divergent angle is small is aligned with the main scanning direction.

According to the above configuration, when the distance between the deflector and the condensing lens to miniaturize the condensing lens, a size required of the beam in the sub-scanning direction is obtained by aligning the direction in which the light beam divergent angle is large with the sub-scanning direction. In addition, a size required of the beam in the main scanning direction is obtained by the second function of the light condensing and diffusing member. Both of miniaturization of the condensing lens and a beam size required for an object to be scanned can be achieved thereby.

The above-described optical scanning device may have a configuration in which the light condensing and diffusing member condenses, with the first function, a beam toward the deflector and subsequently spreads the beam toward the condensing lens.

According to the above configuration, the spot diameter of the light beam in the sub-scanning direction is limited on the reflection plane of the deflector, and a desired linewidth can be obtained at the point of time when the light beam enters the condensing lens.

The above-described optical scanning device may have a configuration in which the linewidth of the light beam is wider in the sub-scanning direction than in the main scanning direction at the point of time when the light beam passes the collimator lens.

The above-described optical scanning device may have a configuration in which an opening width dimension of the aperture is larger in the sub-scanning direction than in the main scanning direction.

The above-described optical scanning device may have a configuration in which the light condensing and diffusing member is a single lens having a concave lens-shaped cross section in the main scanning direction and having a convex lens-shaped cross section in the sub-scanning direction.

According to the above configuration, the number of lenses can be reduced by making the light condensing and diffusing member a single lens, contributing to miniaturization of the optical scanning device. Use of a single lens provides the following advantages: the optical path length of the incident system can be shortened, and the transmittance of the optical system as a whole can be increased.

The above-described optical scanning device may have a configuration in which the shortest distance between the deflector and the condensing lens falls within a range of 20-30 mm.

The above-described optical scanning device may have a configuration in which the condensing lens has no function to steer, at a constant speed on an image plane of the object to be scanned, the light beam steered, by the deflector, at a constant angle in the main scanning direction.

In order to solve the above-described problem, an image forming device which is a second aspect of the present disclosure comprises the above-described optical scanning device.

By virtue of aligning, with the sub-scanning direction, the direction in which the light beam divergent angle is large, making the width dimension of the light beam limited by the aperture larger in the sub-scanning direction than in the main scanning direction, and the second function of the light condensing and diffusing member to diffuse a beam in the main scanning direction, the optical scanning device and image forming device of the present disclosure provide the effect of being capable of achieving a required beam size while shortening the distance between the deflector and the condensing lens to miniaturize the condensing lens.

BRIEF DESCRIPTION OF THE DRAWINGS

FIG. 1 is a plan view showing one embodiment of the present disclosure and showing one example of the layout of an optical system inside an optical scanning unit viewed from the sub-scanning direction side.

DESCRIPTION OF THE PREFERRED EMBODIMENTS

Embodiment 1

Figure 1:
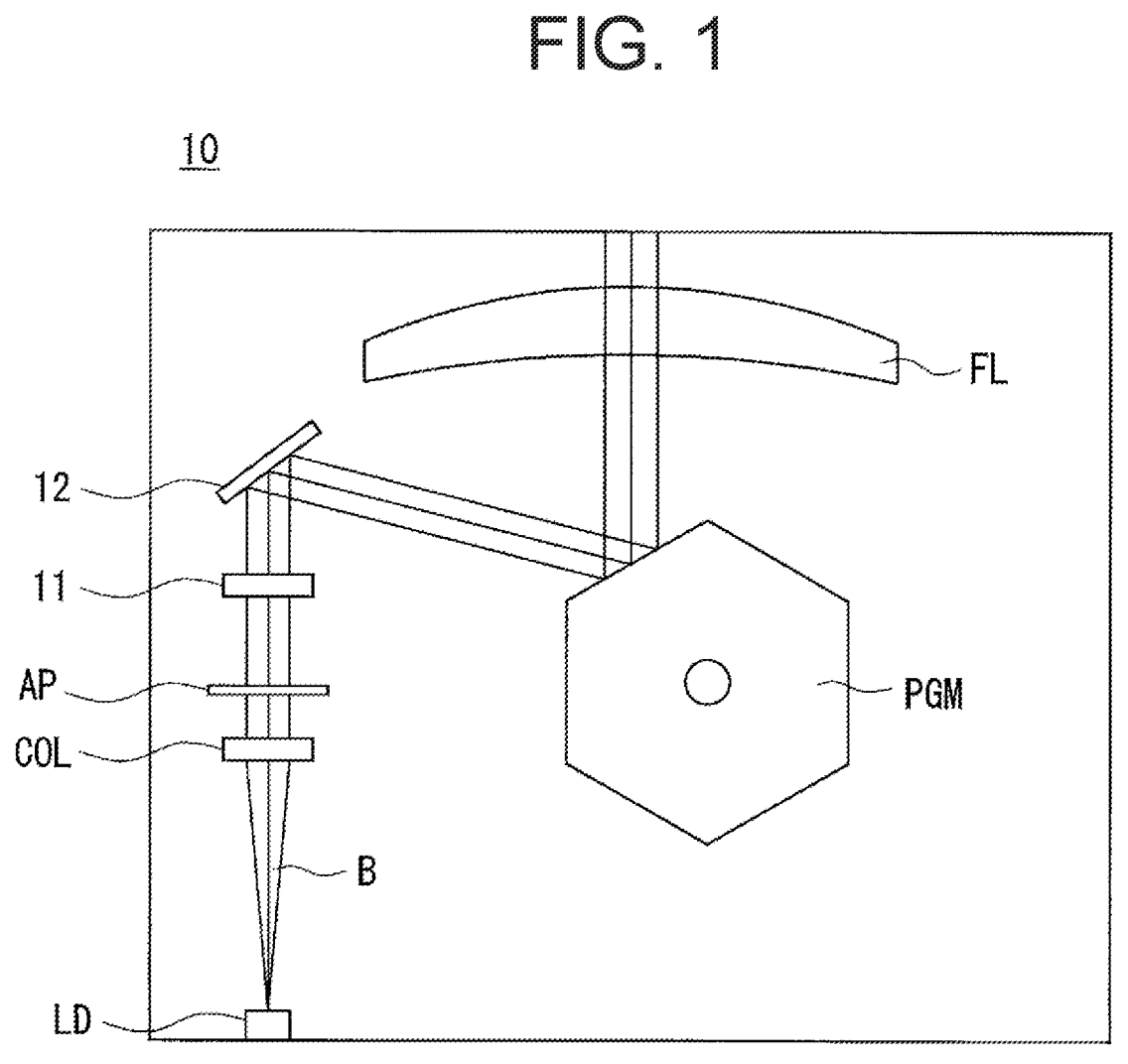
Figure 2:
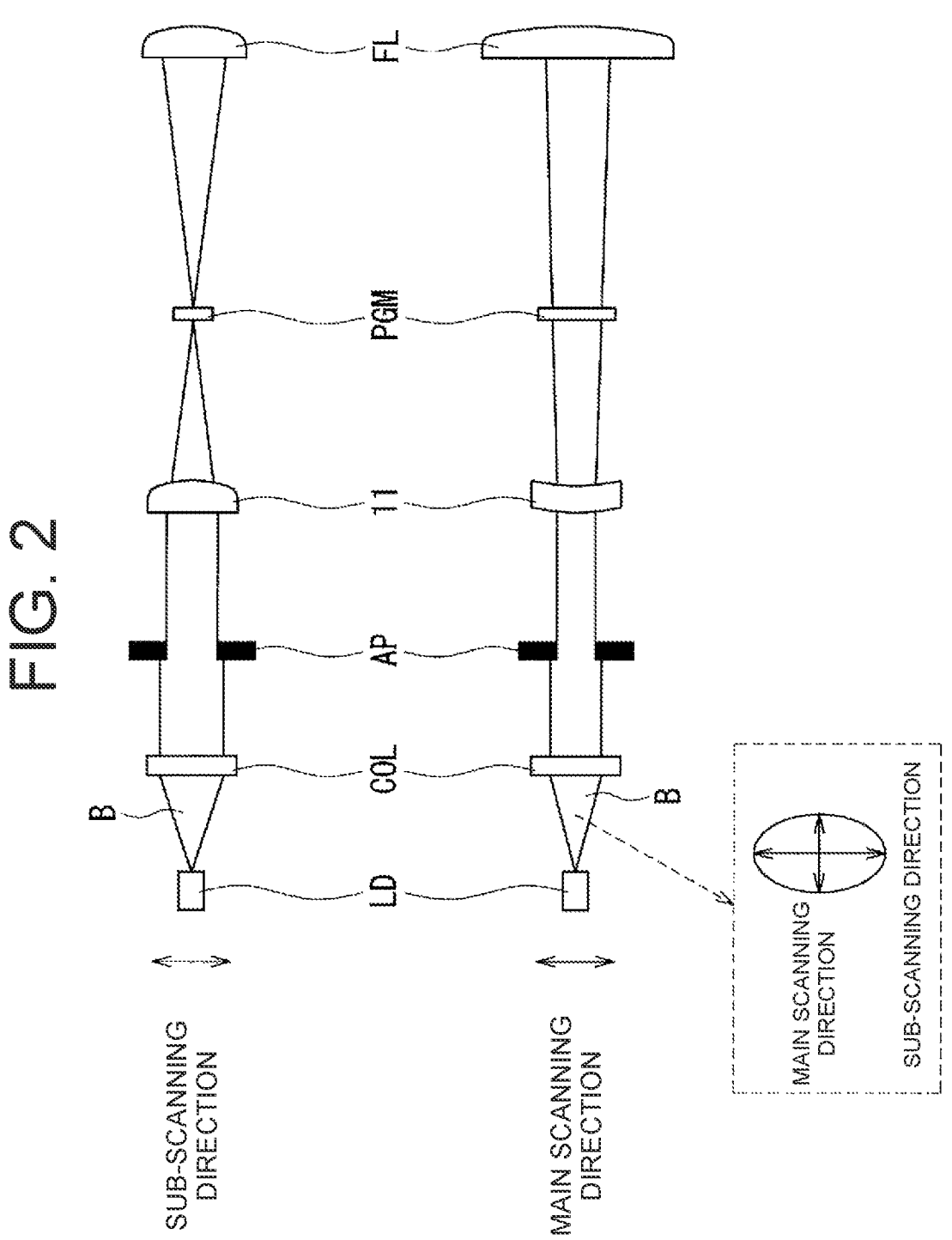
FIG. 2 is a diagram showing a schematic configuration of an optical system in an optical scanning unit according to Embodiment 1.

Hereinafter, embodiments of the present disclosure will be explained in detail with reference to drawings. FIG. 1 is a plan view showing one example of the layout of an optical system inside an optical scanning unit 10 according to Embodiment 1 viewed from the sub-scanning direction side. FIG. 2 is a diagram showing a schematic configuration of the optical system in the optical scanning unit 10. The optical scanning unit 10 shown here is used as an optical scanning device that writes a latent image onto an image carrier (photoreceptor drum) in an image forming device such as a multifunction machine.

As shown in FIG. 1, the optical scanning unit 10 includes, as an optical system inside thereof, a laser diode (light emitting element) LD, a collimator lens COL, an aperture AP, a polygon mirror (deflector) PGM, and a condensing lens FL. The collimator lens COL converts a light beam B emitted from the laser diode LD into parallel light. The aperture AP is an opening window that cuts part of the light beam B and forms same into a rectangular beam. The polygon mirror PGM is a deflector that steers (deflects) the light beam B in the main scanning direction. The condensing lens FL condenses the light beam B deflected by the polygon mirror PGM toward an image plane (surface of a photoreceptor drum, which is an object to be scanned). The optical scanning unit 10 may include, as appropriate, a reflecting mirror 12 that converts the direction of the light beam B. The deflector is not limited to the polygon mirror PGM, and a micro electro mechanical systems (MEMS) mirror and the like may also be used.

The illustrated optical scanning unit 10 uses, as the condensing lens FL, an F-lens with no θ property. Conventionally, Fθ lenses with θ properties are generally used as a condensing lens placed in the latter stage of a deflector (the downstream side of a light beam B). In recent years, however, configurations in which θ properties are realized through electronic control of light beams, and condensing lenses with no θ property are used have also been suggested. Using an F lens with no θ property as a condensing lens FL also contributes to miniaturization of the condensing lens. In this regard, however, the present disclosure is not limited to such a configuration, and the condensing lens placed in the latter stage of the polygon mirror PGM may be an Fθ lens with θ properties. Incidentally, Fθ lenses with θ properties are lenses having the function to steer, at a constant speed on the image plane of the object to be scanned, the light beam B steered at a constant angle by the polygon mirror PGM. In contrast, F lenses with no θ property are defined as a lens that does not have the above-described function. Even in the case where the condensing lens FL has no θ property, writing can be conducted on the image plane of the object to be scanned, as in the case of using an Fθ lens as the condensing lens FL, through electronic control of the light beam B (writing timing control for image data).

Figure 5:
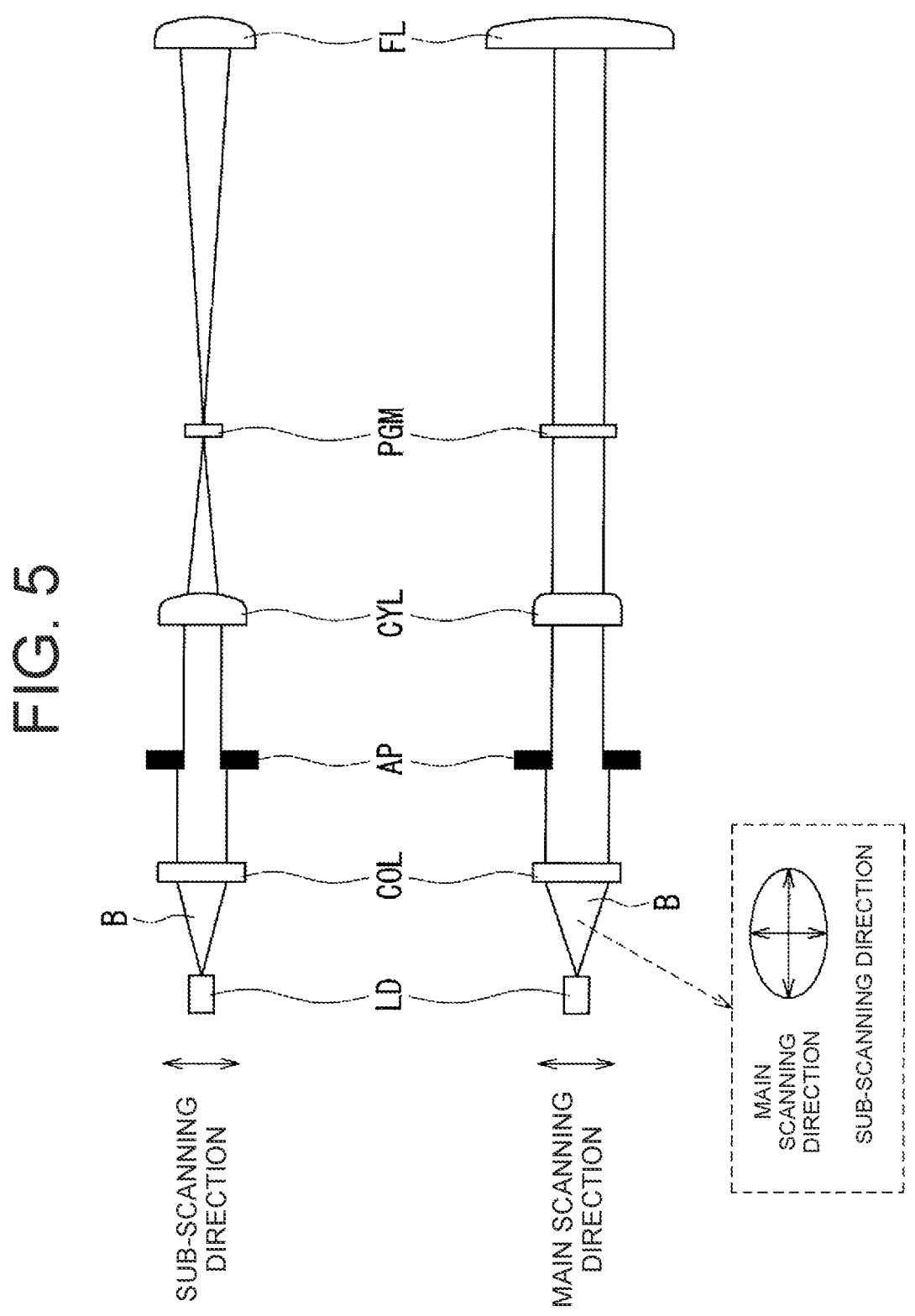
FIG. 5 is a diagram showing a schematic configuration diagram of an optical system in a conventional optical scanning device.
Figure 6:
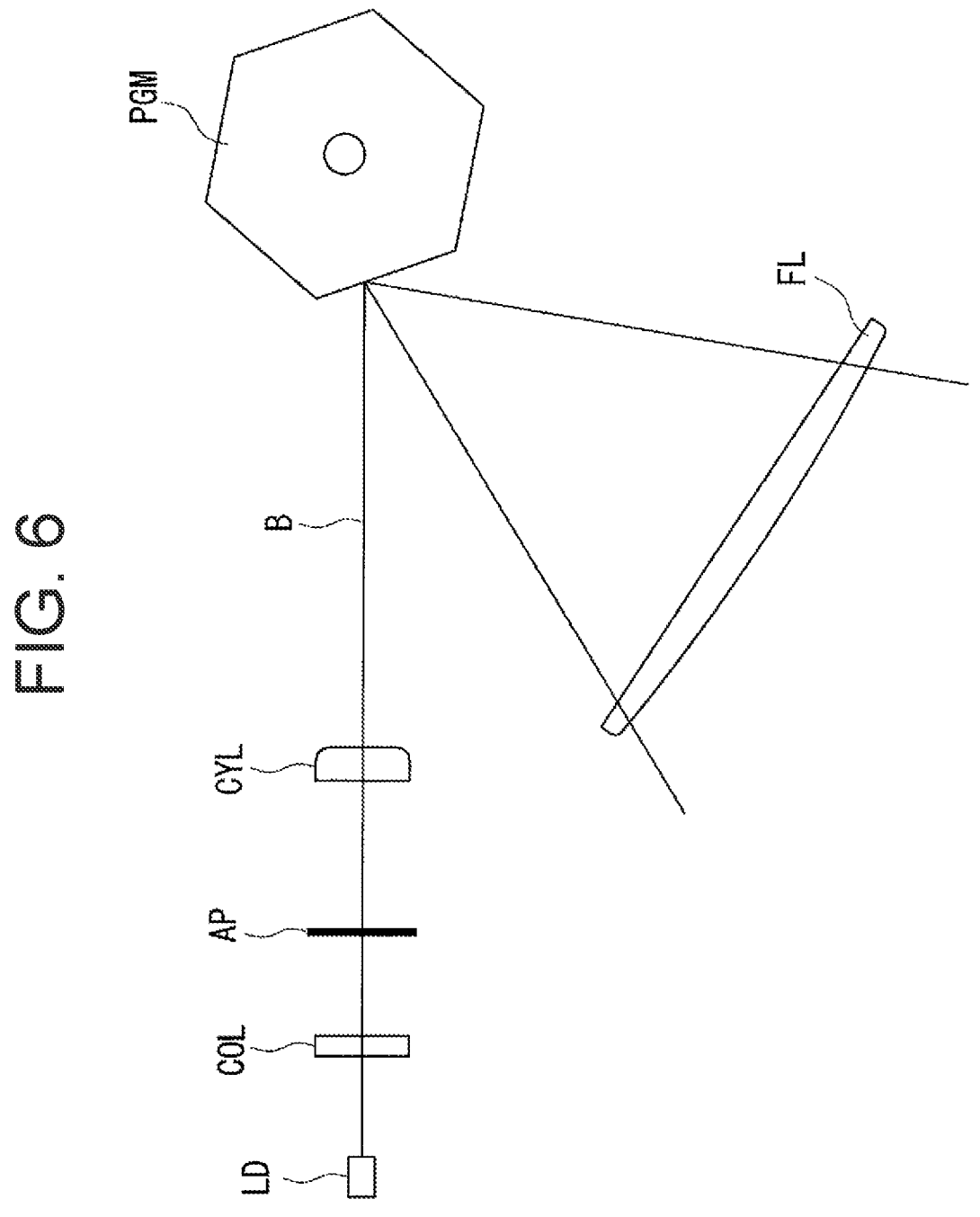
FIG. 6 is one example of the layout of an optical system in an optical scanning device viewed from the sub-scanning direction side.

The optical scanning unit 10 of FIG. 1 differs from a conventional optical scanning unit shown in FIG. 5 in Feature 1 and Feature 2 bellow.

Feature 1: The light beam B emitted from the laser diode LD is designed such that, as shown in FIG. 2, the major axis (direction in which the divergent angle is large) of the ellipse is aligned with the sub-scanning direction, and the minor axis (direction in which the divergent angle is small) of the ellipse is aligned with the main scanning direction. The linewidth at the point of time when the light beam B passes the collimator lens COL is wider in the sub-scanning direction than in the main scanning direction thereby. In addition, the opening width dimension (3.34 mm in the main scanning direction×5.14 mm in the sub-scanning direction) of the aperture AP is correspondingly made larger in the sub-scanning direction than in the main scanning direction.

Feature 2: A first lens (light condensing and diffusing member) 11 is provided between the aperture AP and the polygon mirror PGM instead of the cylindrical lens CYL in FIG. 5. The first lens 11 has, as shown in FIG. 2, the function to condense a beam in the sub-scanning direction (cylindrical lens function: first function) and the function to diffuse a beam in the main scanning direction (expander lens function: second function). The cylindrical lens function in the sub-scanning direction of the first lens 11 is a lens function approximately equal to that of the conventional cylindrical lens CYL. That is, the focal length of the first lens 11 in the sub-scanning direction is approximately equal to that of the conventional cylindrical lens CYL. The first lens 11 has the cylindrical lens function in the sub-scanning direction because the spot diameter of the light beam B in the sub-scanning direction is limited on the reflection plane of the polygon mirror PGM, and the dimension in the sub-scanning direction (height direction) of the polygon mirror PGM is limited. The light beam B condensed in the sub-scanning direction by the first lens 11 is diffused after reflection at the polygon mirror PGM, and a desired linewidth is obtained at the point of time when the light beam enters the condensing lens FL thereby.

The following distances are shown as examples of the arrangement distances (distances in the optical axis direction) in the optical system inside the optical scanning unit 10 in FIG. 1.

Distance between LD and COL: 32 mm
Distance between COL and AP: 5 mm
Distance between AP and first lens 11: 10 mm
Distance between first lens 11 and reflecting mirror 12: 10 mm
Distance between reflecting mirror 12 and PGM: 30 mm
Distance between PGM and FL: 25 mm The width dimension (dimension in the direction perpendicular to the optical axis) of the condensing lens FL is set to be 50 mm.

As the optical scanning unit 10 according to Embodiment 1 has Feature 1 and Feature 2, the PGM-FL distance can be shortened compared to conventional ones, and the condensing lens FL can be miniaturized. Furthermore, a required beam size (about 60 μm both in the main scanning direction and sub-scanning direction) can be obtained (the spot diameter of the beam can be sufficiently limited) on the image plane, while shortening the PGM-FL distance. Hereinafter, optical effects in the sub-scanning direction and main scanning direction will be explained with reference to FIG. 2.

In the sub-scanning direction, a required beam size can be obtained by Feature 1. That is, the linewidth in the sub-scanning direction of the light beam B after passing the collimator lens COL and aperture AP (light beam B entering the first lens 11) can be made wider than those in conventional ones by aligning, with the sub-scanning direction, the major axis of the ellipse of the light beam B emitted from the laser diode LD. When the linewidth of the light beam B entering the first lens 11 is widened, the linewidth of the light beam B entering the condensing lens FL can be correspondingly widened.

That is, in the sub-scanning direction, reduction in the linewidth of the light beam B entering the condensing lens FL in the case where the PGM-FL distance is shortened can be compensated by the configuration of Feature 1. As a result, even when the PGM-FL distance is made shorter than those in conventional ones, it is possible to make the linewidth of the light beam B entering the condensing lens FL approximately equal to those in conventional ones, and a required beam size on the image plane can be obtained.

Incidentally, the linewidth of the light beam B entering the condensing lens FL can be widened by shortening the focal length of the cylindrical lens CYL, also in the conventional configuration shown in FIG. 5. However, the aberration of the cylindrical lens CYL increases and performance of the optical scanning unit 10 deteriorates in such a method. Furthermore, since the linewidth in the sub-scanning direction of the light beam B after emission is narrowed, the focal length of the cylindrical lens CYL is made extremely short. Arrangement is therefore made difficult when taking positional relation with other expensive components into account. As described above, in the optical scanning unit 10, as the focal length in the sub-scanning direction of the first lens 11 is approximately equal to that of the conventional cylindrical lens CYL, the linewidth of the light beam B entering the condensing lens FL can be widened without causing these problems.

On the other hand, in the main scanning direction, the linewidth of the light beam B entering the first lens 11 is made narrower than those in conventional ones by virtue of Feature 1, contrary to the sub-scanning direction. As such, a required beam size is obtained through Feature 2 in the main scanning direction. That is, the linewidth in the main scanning direction of the light beam B entering the condensing lens FL can be ensured by converting parallel light into diffusion light by means of the second function of the first lens 11. As a result, it is possible to make the linewidth of the light beam B entering the condensing lens FL approximately equal to those in conventional ones, also in the main scanning direction, and a required beam size on the image plane can be obtained.

In the optical scanning unit 10, the PGM-FL distance can be decreased to about 25 mm (more specifically, about 20-30 mm) from about 40-50 mm, a conventional PGM-FL distance, and the arrangement in which the condensing lens FL is brought close to the polygon mirror PGM can be achieved. The length of the condensing lens FL in the main scanning direction can be significantly shortened compared to those in conventional ones to miniaturize the condensing lens FL thereby. Miniaturization of the condensing lens FL also allows the optical scanning unit 10 itself to be miniaturized. As a matter of course, shortening of the PGM-FL distance per se can contribute to miniaturization of the optical scanning unit 10. Incidentally, the PGM-FL distance in this case refers to the shortest distance between the polygon mirror PGM and the condensing lens FL.

In Embodiment 1, a configuration in which the cylindrical lens function in the sub-scanning direction and the expander lens function in the main scanning direction are imparted to a single lens, that is, the first lens 11 is illustrated. By virtue of imparting both the cylindrical lens function and the expander lens function to the first lens 11, this configuration can reduce the number of lenses used and can contribute to miniaturization of the optical scanning unit 10. Use of the single first lens 11 provides the following advantages: the optical path length of the incident system can be shortened, and the transmittance of the optical system as a whole can be increased.

Figure 3:
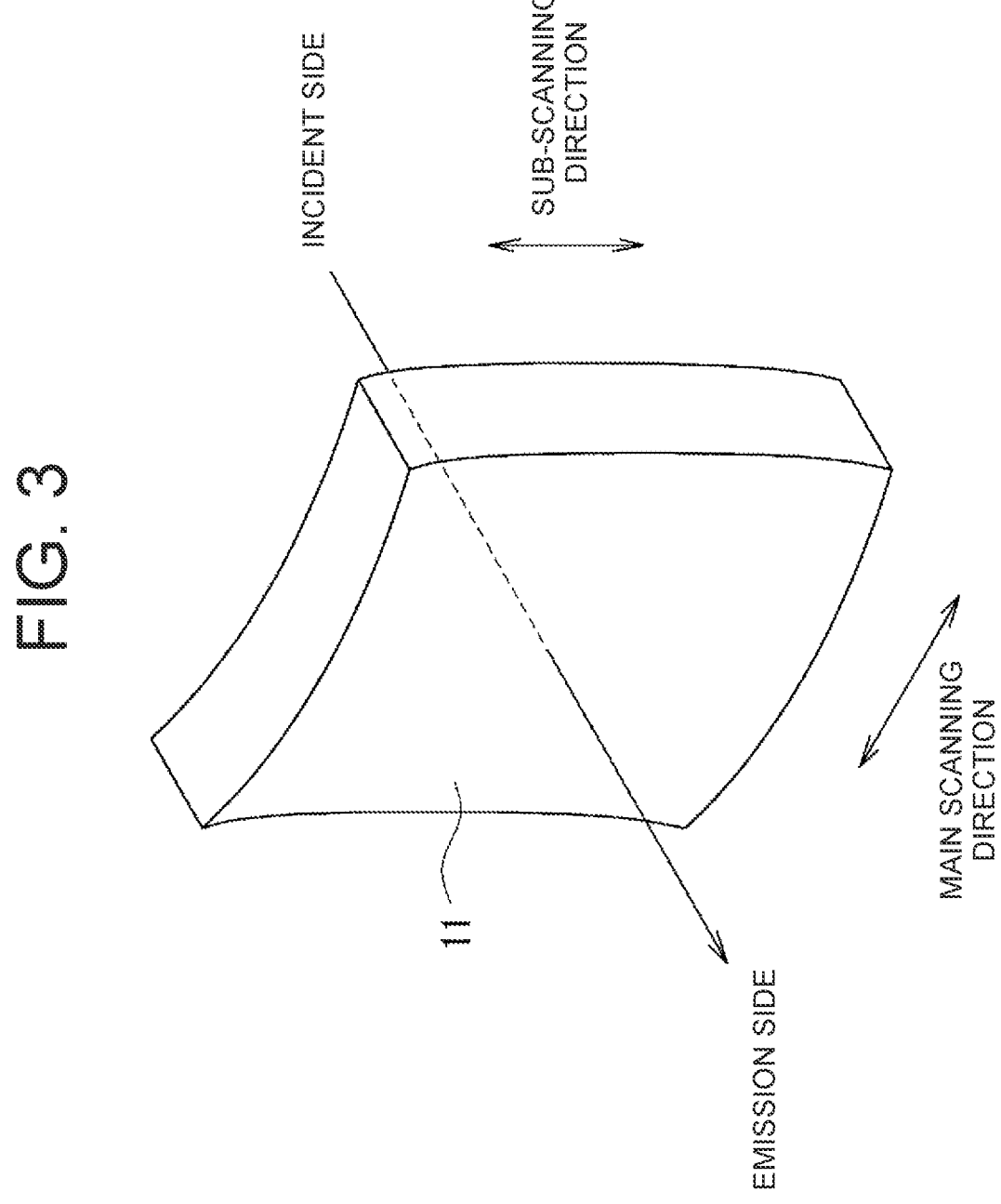
FIG. 3 is a perspective view showing an example of the shape of a first lens.

FIG. 3 is a perspective view showing an example of the shape of the first lens 11 used. The first lens 11 has, in the main scanning direction, a concave lens-shaped cross section in which the central part is thinner than the peripheral part in order to diffuse a beam. The first lens 11 has, in the sub-scanning direction, a convex lens-shaped cross section in which the central part is thicker than the peripheral part in order to condense a beam. Incidentally, in the example shown in FIG. 3, the shape on the incident side is concave (the shape on the emission side is convex) in the main scanning direction, functioning as a concave lens as a whole. Meanwhile, the shape on the incident side is convex (the shape on the emission side is concave) in the sub-scanning direction, functioning as a convex lens as a whole. The present disclosure is not limited thereto, and the shape on either of the emission side or the incident side may be concave or the both sides may have a concave shape, in the main scanning direction of the first lens 11. Similarly, in the sub-scanning direction, the shape on either of the emission side or the incident side may be convex or the both sides may have a convex shape.

Embodiment 2

Figure 4:
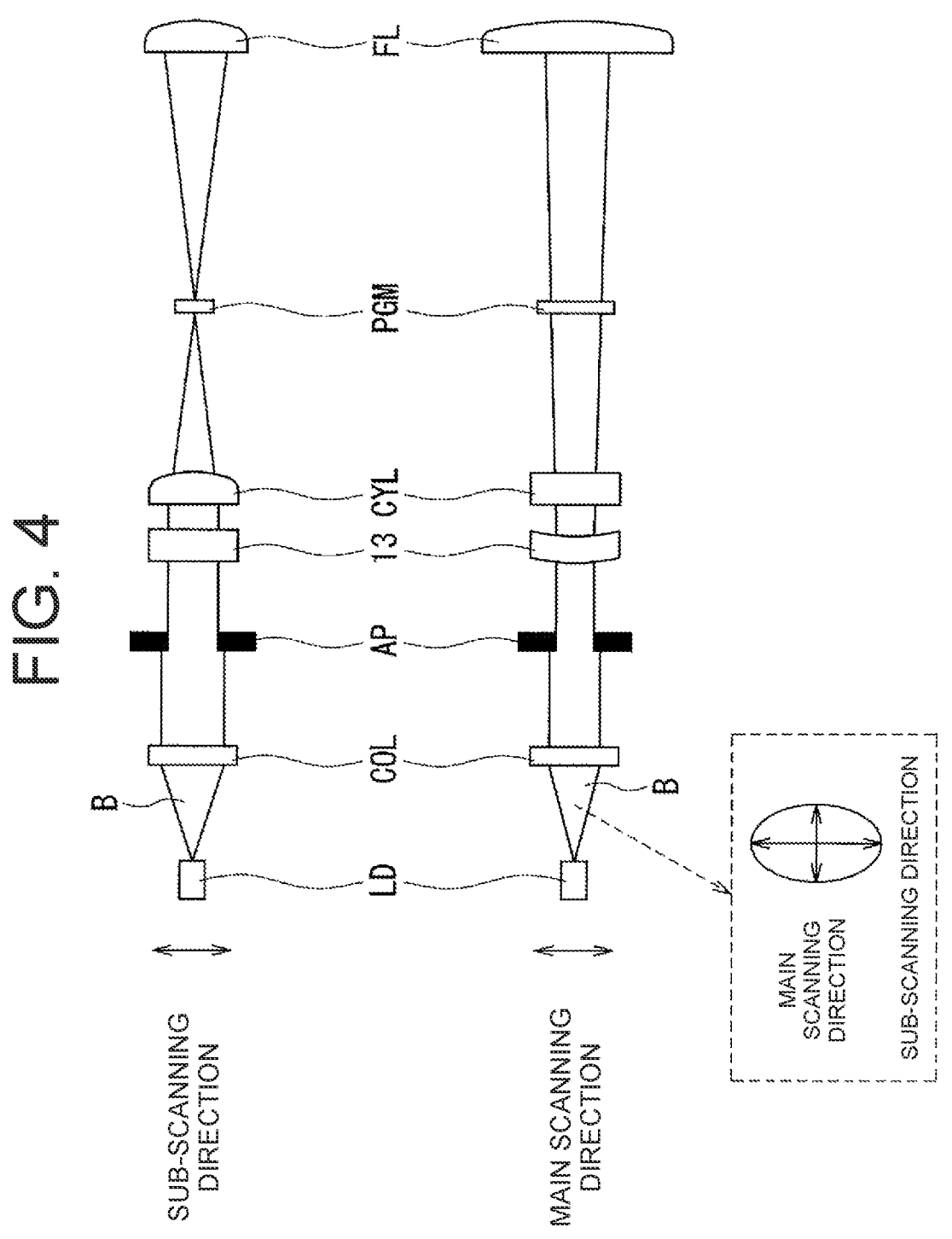
FIG. 4 is a diagram showing a schematic configuration of an optical system in an optical scanning unit according to Embodiment 2.

In the optical scanning unit 10, the cylindrical lens function in the sub-scanning direction and the expander lens function in the main scanning direction are not required to be imparted to a single lens but may be imparted to different lenses, respectively. FIG. 4 is a diagram showing a schematic configuration of an optical system in an optical scanning unit 10 according to Embodiment 2.

The optical scanning unit 10 shown in FIG. 4 has a configuration provided with a cylindrical lens CYL and a second lens 13 instead of the first lens 11 of Embodiment 1. That is, the light condensing and diffusing member set forth in the claims includes both a cylindrical lens CYL and a second lens 13. A member similar to that in the conventional optical scanning unit shown in FIG. 5 may be used as the cylindrical lens CYL, and the cylindrical lens CYL has a light condensing function only in the sub-scanning direction. The second lens 13 has a diffusion function only in the main scanning direction and has no lens function in the sub-scanning direction. The cylindrical lens CYL and the second lens 13 are both placed between an aperture AP and a polygon mirror PGM. However, the placement order of the cylindrical lens CYL and the second lens 13 may be reversed.

In the optical scanning unit 10 of FIG. 4, the cylindrical lens function in the sub-scanning direction is imparted to the cylindrical lens CYL, and the expander lens function in the main scanning direction is imparted to the second lens 13. Even with this configuration in which the cylindrical lens function in the sub-scanning direction and the expander lens function in the main scanning direction are imparted to different lenses, respectively, the effect same as Embodiment 1 can be brought about.

The embodiments disclosed herein are examples in terms of all aspects and do not form the basis for limited interpretation. Accordingly, the technical scope of the present disclosure is not interpreted solely in terms of the above-described embodiments and is defined on the basis of the claims. Furthermore, all modifications within the meaning and scope equivalent to the claims are encompassed.

What is claimed is:

1. An optical scanning device steering, in a main scanning direction, a light beam emitted from a light emitting element using a deflector, the optical scanning device comprising:

a collimator lens disposed between the light emitting element and the deflector, and converting the light beam emitted from the light emitting element into parallel light;

an aperture cutting part of the light beam, and forming the light beam into a rectangular beam;

a condensing lens disposed on a downstream side of the light beam with respect to the deflector, and condensing the light beam, deflected by the deflector, toward an object to be scanned; and a light condensing and diffusing member disposed between the aperture and the deflector, and having a first function to condense the light beam in a sub-scanning direction and a second function to diffuse the light beam in the main scanning direction, wherein:

divergent angles of the light beam emitted from the light emitting element in two intersecting directions are different from each other, a direction of the two intersecting directions, for which a light beam divergent angle is large, is aligned with the sub-scanning direction, a direction of the two intersecting directions, for which a light beam divergent angle is small, is aligned with the main scanning direction, and a linewidth of the light beam in the sub-scanning direction is wider than a linewidth of the light beam in the main scanning direction at a point of time when the light beam passes through the collimator lens.

2. The optical scanning device according to claim 1, wherein the light condensing and diffusing member condenses, with the first function, the light beam toward the deflector and subsequently spreads the light beam toward the condensing lens.

3. The optical scanning device according to claim 1, wherein an opening width dimension of the aperture in the sub-scanning direction is larger than an opening width dimension of the aperture in the main scanning direction.

4. The optical scanning device according to claim 1, wherein the light condensing and diffusing member is a single lens having a concave lens-shaped cross section in the main scanning direction and having a convex lens-shaped cross section in the sub-scanning direction.

5. The optical scanning device according to claim 1, wherein a shortest distance between the deflector and the condensing lens falls within a range of 20-30 mm.

6. The optical scanning device according to claim 1, wherein the condensing lens has no function to steer, at a constant speed on an image plane of the object to be scanned, the light beam that is steered, by the deflector, at a constant angle in the main scanning direction.

7. An image forming device comprising the optical scanning device according to claim 1.

* * * * *